March 5, 1929.  M. G. MASTERS  1,704,572
AIR OPERATED ADVERTISING DEVICE
Filed Aug. 4, 1927
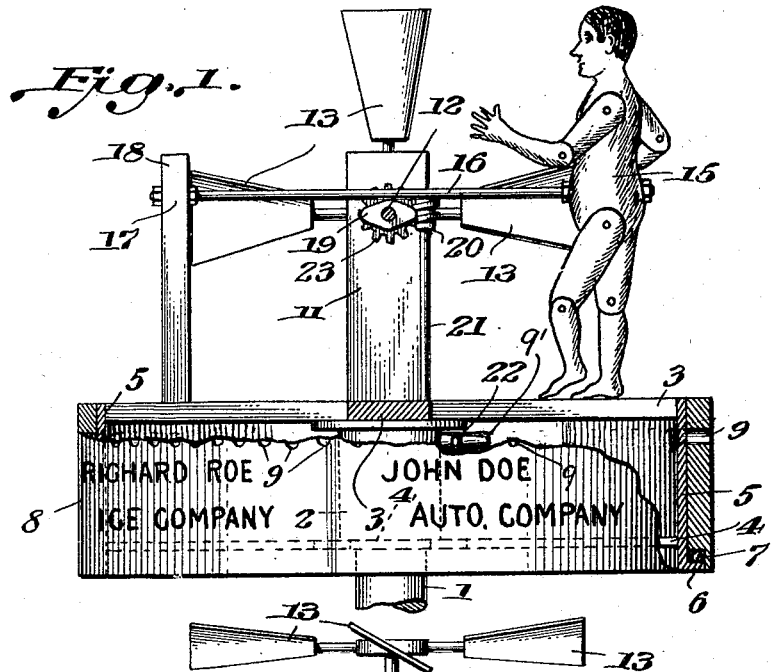
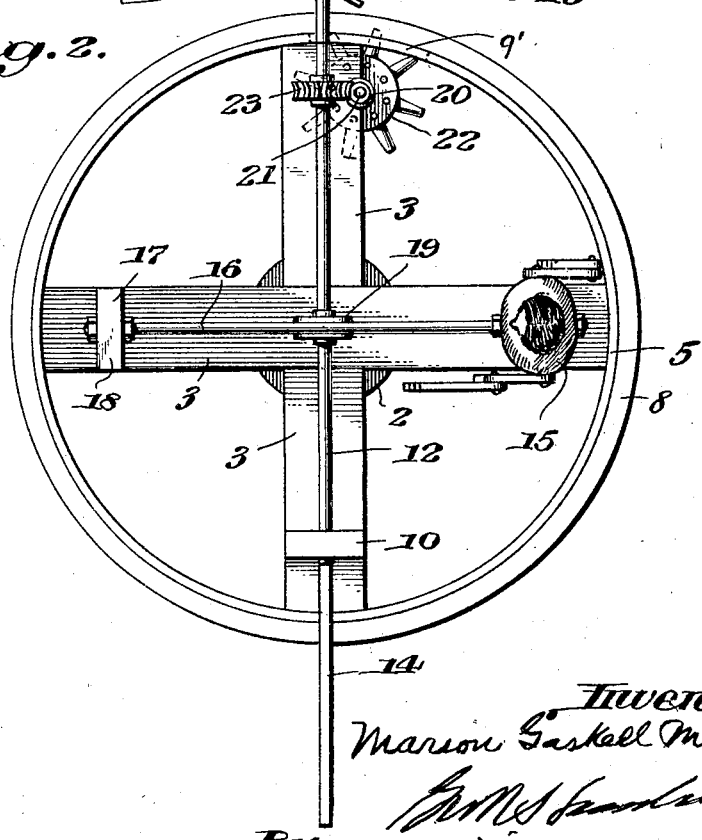
Inventor:
Marion Gaskell Masters Patented Mar. 5, 1929.

1,704,572

UNITED STATES PATENT OFFICE.

MARION GASKELL MASTERS, OF EVANSVILLE, INDIANA, ASSIGNOR OF ONE-HALF TO WILHELMINA COX, OF VANDERBURG COUNTY, INDIANA.

AIR-OPERATED ADVERTISING DEVICE.

Application filed August 4, 1927. Serial No. 210,540.

This invention relates to an improved advertising device employing movable parts for the display of advertisements, wind or air operated means for keeping the advertisement displaying parts in motion, and a figure which is kept in motion by the operation of the air or wind operated devices, the whole constituting a device which attracts the attention of passers by and maintains their interest so that they naturally observe the advertisements which are displayed.

My invention comprehends a wind or air operated means such as a wind wheel, a dancing figure arranged to be actuated thereby, preferably means for holding the wind wheel in the wind, and a rotarily mounted advertisement-display structure or wheel which is turned by the wind wheel.

The wind wheel serves the double purpose of operating the dancing figure and rotating an advertisement display wheel or structure so that the gyrations of the figure, while attracting, and holding, the attention of passers-by, are necessarily associated with the operation of the advertisement-display arrangement and attention is thus brought to the advertisements.

A practical embodiment of the invention is set forth hereinafter but it will be understood that modifications may be resorted to without departing from the principle of the invention.

In the accompanying drawings:

Figure 1, is a side elevation, partly in section; and

Fig. 2, is a plan view.

The device is supported by an upright 1 which carries a revoluble hub or cap 2 at its upper end. The upright or stand 1 may be secured or supported in any desired position.

Secured to the hub 2 are crossed upper pieces 3 and crossed lower pieces 4. A circular rim or band 5 is carried by cross pieces 3 and 4 and, with them, constitutes a revoluble wheel which turns on the upright 1. The rim or band 5 has a laterally arranged flange 6 for the support of the ball bearings or cage of balls 7 whose purpose will presently appear.

Surrounding the rim 5 and mounted on the balls or bearings 7 is an outer, advertisement-display band or ring 8 which is adapted to revolve around the rim 5, as will presently appear. The ring 8 is provided with holes 9 by which it is positively driven. The ring 8 is provided with advertising matter of any character, for instance different announcements of the same advertiser or of different advertisers. These advertisements appearing on the outer face of the ring 8 are successively brought to the attention of the observer as the ring 8 revolves.

Mounted on the cross piece 3 are bearings 10 and 11 and in these bearings is mounted a revoluble shaft 12. A wind or air driven wheel 13 is secured to the shaft 12 and is utilized to rotate said shaft. Ordinary wind pressure, or artificial air pressure may be used to rotate the wind wheel 13.

Secured to one of the bearings 10 is a tail 14 which serves as a rudder to hold the wheel 13 in the wind. This tail is preferably provided with advertising matter on one or both sides thereof.

An articulated dancing figure 15 of any kind is mounted so that it will vibrate up and down on one of the pieces 3. This figure is supported by a strip, rod, or piece 16 which is suitably secured as at 17 to an upright 18 carried by the piece 3.

A single, double, or any other kind of cam or agitator 19 which is secured to the shaft 12, is adapted to wipe against the spring rod or piece 16, as the shaft 12 turns, thereby to jiggle or vibrate the figure 15 so that it will go through its gyrations and will dance on the piece 3.

Mounted in suitable brackets 20 on the bearing 11, is a revoluble shaft 21 which carries on its lower end a pin or star wheel 22 whose points project through a slot 9' in the rim 5 and are arranged to enter the holes 9 in the ring 8 for the purpose of rotating said ring from the shaft 12.

Any suitable means such as shown at 23 may be provided on the shaft 12 and on the shaft 20 for the purpose of driving the shaft 20 so that the ring 8 will be turned.

Under natural or artificial air pressure, the wind wheel 12 rotates, thereby vibrating the figure 15 which goes through amusing and entertaining gyrations and imitates various kinds of dancing.

At the same time, the ring 8 is rotated and the advertisements are successively brought into view and as they are just below the dancing figure 15, they necessarily are seen by the observers and thus the advertising value of the device is obtained.

What I claim is:

1. In an air operated advertising device, the combination with a rotarily mounted structure having a rim and a central hub, of an independent, rotarily mounted ring surrounding, and carried by, the said rim, air operated means carried by the aforesaid structure, and means operated by said air operated means adapted for revolving the ring in relation to the rim, without interfering with the turning of the aforesaid structure.

2. In an air operated advertising device, the combination with a rotarily mounted structure having a rim and a central hub, of an independent, rotarily mounted ring surrounding, and carried by, the said rim, a shaft carried by the hub and rim, a wind wheel for turning said shaft, an operative device operated by the shaft, and an operative connection between the shaft and the ring whereby the ring will be rotated by the wind wheel while the operative device is being actuated.

In testimony whereof I affix my signature.

MARION GASKELL MASTERS.